(12) United States Patent
Shi et al.

(10) Patent No.: US 12,049,537 B2
(45) Date of Patent: Jul. 30, 2024

(54) FLUORINATED, ALKOXYSILYL-FUNCTIONAL POLYMER FOR ANTI-STAIN AND ANTI-SCRATCH COATINGS

(71) Applicant: Akzo Nobel Coatings International B.V., Amsterdam (NL)

(72) Inventors: Zheng Shi, Shanghai (CN); Xingshun Chen, Zhejiang (CN); Quan James Huang, Zhejiang (CN); Puxin Fang, Zhejiang (CN); Lin Hong, Shanghai (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 17/914,556

(22) PCT Filed: Apr. 9, 2021

(86) PCT No.: PCT/EP2021/059257
§ 371 (c)(1),
(2) Date: Sep. 26, 2022

(87) PCT Pub. No.: WO2021/209327
PCT Pub. Date: Oct. 21, 2021

(65) Prior Publication Data
US 2023/0141530 A1    May 11, 2023

(30) Foreign Application Priority Data

Apr. 13, 2020   (WO) ............... PCT/CN2020/084479
Jun. 10, 2020   (EP) .................................. 20174341

(51) Int. Cl.
| C08G 18/50 | (2006.01) |
| C08G 18/10 | (2006.01) |
| C08G 18/24 | (2006.01) |
| C08G 18/28 | (2006.01) |
| C08G 18/75 | (2006.01) |
| C08G 77/24 | (2006.01) |
| C09D 7/65 | (2018.01) |
| C09D 175/04 | (2006.01) |

(52) U.S. Cl.
CPC ......... *C08G 18/5015* (2013.01); *C08G 18/10* (2013.01); *C08G 18/246* (2013.01); *C08G 18/2865* (2013.01); *C08G 18/289* (2013.01); *C08G 18/755* (2013.01); *C08G 77/24* (2013.01); *C09D 7/65* (2018.01); *C09D 175/04* (2013.01); *C08G 2150/00* (2013.01)

(58) Field of Classification Search
CPC .. C08G 18/5015; C08G 18/10; C08G 18/246; C08G 18/2865; C08G 18/289; C08G 77/24; C08G 2150/00; C08G 18/755; C09D 7/65; C09D 175/04
See application file for complete search history.

(56) References Cited

U.S. PATENT DOCUMENTS

| 7,803,894 | B2 | 9/2010 | Dams et al. |
| 7,825,272 | B2 * | 11/2010 | Iyer ..................... C08G 18/837 |
| | | | 556/400 |
| 9,879,153 | B2 | 1/2018 | Wang et al. |
| 10,119,035 | B2 | 11/2018 | Wynne et al. |
| 2017/0355876 | A1 | 12/2017 | Klein et al. |
| 2019/0100675 | A1 | 4/2019 | Zielinski et al. |

FOREIGN PATENT DOCUMENTS

| CN | 105482677 A | 4/2002 |
| CN | 1902249 | 1/2007 |
| CN | 101563383 | 10/2009 |
| CN | 102585682 A | 7/2012 |
| CN | 103555184 A | 2/2014 |
| CN | 105801797 | 7/2016 |
| CN | 106674473 | 5/2017 |
| CN | 106750432 | 5/2017 |
| CN | 106752819 A | 5/2017 |
| CN | 106432686 B | 12/2018 |
| CN | 109535362 | 3/2019 |
| CN | 106349452 A | 1/2024 |
| CN | 1085246524 | 4/2024 |
| EP | 0731125 A1 | 9/1996 |
| EP | 1559733 A1 | 8/2005 |
| JP | 2001-524558 A * | 12/2001 |
| WO | WO2006/032512 A2 | 3/2006 |
| WO | WO2008/076639 A1 | 6/2008 |
| WO | WO2008/138927 A1 | 11/2008 |
| WO | WO2009/095325 A1 | 8/2009 |

OTHER PUBLICATIONS

"International Preliminary Report on Patentability," for PCT Application No. PCT/EP2021/059257 mailed Oct. 13, 2022 (7 pages).
English Translation of CN102585682A.
English Translation of CN103555184A.
English Translationof CN105482677A.
English Translation of CN105524552A.
English Translation of CN106349452A.
English Translation of CN106432686A.
English Translation of CN106752819A.
English Translation of WO2006032512A2.
English Translation of WO2009095325A1.

(Continued)

*Primary Examiner* — Rabon A Sergent
(74) *Attorney, Agent, or Firm* — Pauly, DeVries Smith & Deffner LLC

(57) ABSTRACT

A fluorinated, alkoxysilyl-functional polymer is provided, obtainable by a method comprising the steps of: a) reacting an OH-functional (per)fluoropolyether (PFPE) with a polyisocyanate A under urethane formation reaction conditions, to obtain an isocyanate-functional intermediate B, b) reacting intermediate B with a secondary, alkoxysilyl-functional monoamine C, to obtain the alkoxysilyl-functional polymer. The polymer can be used as an additive in preparation of a coating with easy-clean, anti-stain and anti-scratch properties, which can advantageously be used for coating various substrates in consumer electronics or automotive applications such as glass, metal, metal alloy, anodized substrates, plastics, composite etc.

10 Claims, 1 Drawing Sheet

(56) References Cited

OTHER PUBLICATIONS

European Search Report of Corresponding Application No. 20174341.6, dated Feb. 18, 2021.
International Search Report and Written Opinion of Corresponding International Application No. PCT/EP2021/059257, mailed Jun. 25, 2021.
"First Office Action," for Chinese Patent Application No. 202180022950.2 mailed Mar. 3, 2023 (13 pages) with English Summary.

* cited by examiner

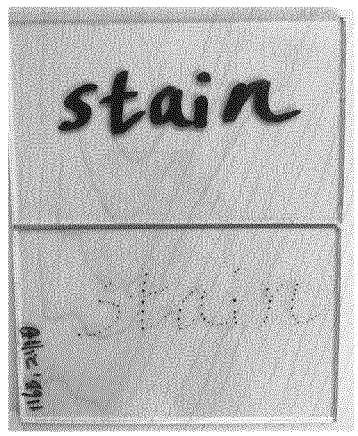 
(a)          (b)

FLUORINATED, ALKOXYSILYL-FUNCTIONAL POLYMER FOR ANTI-STAIN AND ANTI-SCRATCH COATINGS

CROSS-REFERENCE TO RELATED APPLICATIONS

This application is a 35 U.S.C. § 371 national phase application of PCT Application No. PCT/EP2021/059257 (WO 2021/209327 A1), filed on Apr. 9, 2021, which claims priority to International Application No. PCT/CN2020/084479, filed on Apr. 13, 2020 and EP Application No. 20174341.6, filed on Jun. 10, 2020, each of which is incorporated herein by reference in its entirety.

FIELD OF THE INVENTION

The present invention relates to a fluorinated, alkoxysilyl-functional polymer useful in preparation of coating compositions for anti-stain and anti-scratch coatings. The coatings are particularly useful in the field of consumer electronics or automotive coatings.

BACKGROUND

In the field of consumer electronic devices such as cellular phones, tablets, laptops, and automotive interiors various substrates are used, such as glass, metals, plastics, composite etc. It is often desired to cover these substrates with easy-clean, stain-resistant and scratch-resistant coatings. Easy-clean means that that the surface is repellent to water, oil and/or dirt. Easy-clean coatings reduce or eliminate the need to clean the surface.

It is known in the art that fluorinated polymers, particularly, (per)fluoropolyether (PFPE), have non-stick and lubricating properties and can be used to create easy-clean and anti-stain coatings. However, such resins are only soluble in fluorinated solvents and thus difficult to use in coating formulations without the use of special solvents. Another problem with PFPE-based polymers is that they typically do not have good stain and scratch resistance.

There is a need to provide anti-stain coating compositions which are also durable and at the same scratch-resistant. It is further desired that the coating adheres well to various substrates used in consumer electronics and automotive industries, such as glass, metal, metal alloys, anodized substrates, plastics, composite etc.

SUMMARY OF THE INVENTION

In order to address the above-mentioned desires, the present invention provides, in a first aspect, a fluorinated, alkoxysilyl-functional polymer, obtainable by a method comprising the steps of:
  a) reacting an OH-functional (per)fluoropolyether (PFPE) with a polyisocyanate A under urethane formation reaction conditions, to obtain an isocyanate-functional intermediate B,
  b) reacting intermediate B with a secondary, alkoxysilyl-functional monoamine C, to obtain the alkoxysilyl-functional polymer.

In a further aspect, the invention provides a coating composition, comprising the fluorinated, alkoxysilyl-functional polymer according to any one of claims 1-5 and/or a fluorinated silicone resin obtained by hydrolysis of the same polymer, and further a fluorine-free silicone resin.

The invention also provides a method of coating a substrate, comprising applying the coating composition according to the invention to a substrate and curing the coating composition.

In yet another aspect, the present invention provides a coated substrate obtained according to the invention.

BRIEF DESCRIPTION OF THE DRAWINGS

FIG. 1(a) shows an uncoated glass substrate (top) and a coated glass substrate with the coating according to the present invention (bottom).

FIG. 1(b) shows the same as FIG. 1(a), but after wiping with a cloth.

DETAILED DESCRIPTION OF THE INVENTION

The present invention provides a fluorinated, alkoxysilyl-functional polymer. The polymer is based on (per)fluoropolyether (PFPE) and contains alkoxysilyl groups at the ends of the polymer chain.

The fluorinated, alkoxysilyl-functional polymer according to the invention can be obtained by a method comprising the steps of:
  a) reacting an OH-functional (per)fluoropolyether (PFPE) with a polyisocyanate A under urethane formation reaction conditions, to obtain an isocyanate-functional intermediate B,
  b) reacting intermediate B with a secondary, alkoxysilyl-functional monoamineC, to obtain the alkoxysilyl-functional polymer.

Step (a)

In step (a), an OH-functional (per)fluoropolyether is reacted with a molar excess of polyisocyanate A to obtain an isocyanate-functional intermediate B.

(Per)fluoropolyethers (PFPE) are fluorinated polymers comprising a straight or branched fully or partially fluorinated polyoxyalkylene chain that contains recurring units having at least one catenary ether bond and at least one fluorocarbon moiety. PFPE can be divided into non-functional and functional; the former comprises a PFPE chain whose ends bear (per)haloalkyl groups, while the latter comprise a PFPE chain having at least two ends, wherein at least one end comprises a functional group. Functional PFPE, in particular mono- and bifunctional PFPE, comprise a PFPE chain having two ends, wherein one or both end(s) bear(s) a functional group. In some embodiments, it can be preferred to use a bifunctional PFPE. In other embodiments, a monofunctional PFPE is used. Also, mixtures of mono- and bifunctional PFPE can be used in the synthesis step (a).

The PFPE used in the present invention is OH-functional, meaning that at least one end of the polymer chain bears a hydroxyl group (hydroxyl-terminated). The terminating group can also be —$CH_2OH$. The OH-functional PFPE is preferably either monohydroxyl-terminated (PFPE monools) or dihydroxyl-terminated (PFPE diols). In case of monohydroxyl functionality, the other end preferably bears a fully fluorinated group, e.g. —$CF_3$.

The OH-functional (per)fluoropolyether preferably has a number average molecular weight of from 400 to 4000. Mn can be determined by gel permeation chromatography (GPC) using a polystyrene standard with tetrahydrofuran as the mobile phase.

The dihydroxyl-functional (per)fluoropolyether can have a general structure HO—$(CF_2$—$CF_2$—$O)_n$—OH or HO—

$(CF_2—CF_2—O)_n—(CF_2—O)_m—OH$. It can also include blocks with ethylene oxide units and have the general structure:

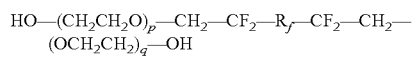

wherein p and q are integers independently chosen from 0 to 50, preferably from 1 to 50, wherein $R_f$ represents a bifunctional radical having (per)fluoropolyether structure $(CF_2CF_2O)_n$, $(CF_2O)_m$ or $(CF_2—CF_2—O)_n—(CF_2—O)_m$, and wherein n and m are integers independently chosen from 1 to 100. When both p and q are not zero, the resulting polymer has a better dispersibility in water. Preferably, p is in the range 1-5 and q is in the range 1-5. Instead of —OH group also—$CH_2OH$ group can be used.

Hydroxy-terminated (per)fluoropolyethers are commercially available from Solvay as Fluorolink® PFPE, or Fomblin® PFPE, e.g. Fluorolink® 5174X, Fluorolink® E10H, Fluorolink® PEG45. Examples of commercially available monohydroxyl-terminated PFPE (PFPE monools) include PFPE1600 and PFPE3200 from Tianjin Changlu Flrorochemicals, and PFPE AL-2 and PFPE AL-4 from Chemours.

Polyisocyanate A is a compound with reactive isocyanate groups and has an isocyanate functionality of at least 2. Preferably, diisocyanates are used. Also mixtures of polyisocyanates can be used. The polyisocyanate can be aliphatic, cycloaliphatic or aromatic. Examples of suitable polyisocyanates include hexamethylene diisocyanate (HDI), 2,2,4- and/or 2,4,4-trimethyl hexamethylene diisocyanate, p- and m-tetramethyl xylene diisocyanate, methylene bis(4-cyclohexyl isocyanate) (hydrogenated MDI), 4,4-methylene diphenyl isocyanate (MDI), p- and m-phenylene diisocyanate, 2,4- and/or 2,6-tolyene diisocyanate (TDI) and addicts thereof, and isophorone diisocyanate (IPDI). Preferred polyisocyanates include aliphatic diisocyanates such as IPDI and HDI. More preferably, cycloaliphatic diisocyanates such as IPDI are used.

The reaction in step (a) is carried out under urethane formation reaction conditions. The reaction conditions of forming the urethane compound are generally known to the skilled person. The reaction temperature can be in the range 40-160° C., preferably in the range 50-100° C. Conventional catalysts can be used such as dibutyl tin dilaurate (DBTDL), stannous octoate, diazobicyclo(2.2.2) octane (DABCO), Zn ACAC, tin octoate. The amount of catalyst is preferably from 0.005 to 1 part by weight per 100 parts by weight of the urethane forming monomers.

The reaction (a) preferably takes place in an organic solvent or a mixture of solvents. Any suitable solvent, non-reactive to the reactants can be used. Examples include esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; ethers (such as diethyl ether, tetrahydrofuran) and mixtures thereof. Preferred organic solvents include n-butyl acetate, N-methyl-pyrrolidone, toluene, methyl isobutyl ketone (MIBK), methyl ethyl ketone (MEK), methoxy propyl acetate (PMA), or mixtures thereof.

The reaction in step (a) is preferably carried out in a molar excess of polyisocyanate A. As a result, the isocyanate-functional intermediate compound B formed in this reaction is isocyanate-functional and can participate in the following reaction step. The molar ratio of PFPE to polyisocyanate A is preferably from 1:1 to 3:1.

Intermediate compound B preferably has a number average molecular weight of from 400 to 4,000, more preferably from 500 to 3,000. Mn can be determined by gel permeation chromatography (GPC) using a polystyrene standard with tetrahydrofuran as the mobile phase. Intermediate B preferably has no carboxyl functionality. Intermediate B also preferably has no OH functionality.

Step (b)

In step (b), isocyanate-functional intermediate compound B is reacted with a secondary, alkoxysilyl-functional monoamine C, to obtain the alkoxysilyl-functional polymer according to the invention.

Alkoxysilyl-functional monoamine C is a secondary aminosilane with one nitrogen atom, wherein the nitrogen atom is substituted with two same or different groups, at least one of which bears alkoxysilyl functionality. The use of secondary aminosilanes in the preparation of the final polymer are believed by the inventors to contribute to a better anti-stain and anti-scratch performance of the coating containing the polymer, than primary aminosilanes.

In some embodiments, it is preferred that both groups bonded to the nitrogen atom of aminosilane C bear alkoxysilyl functionality. Such compounds can also be called (bis-silyl)amines. In other embodiments, only one of the two substitution groups bears alkoxysilyl functionality.

Suitable (bis-silyl)amines can have the following general formula:

wherein Y is a covalent bond or a bifunctional saturated C1-C10 alkylene group, $R_1$ and $R_2$ are independently from each other a C1-C3 alkyl group, x is an integer selected from 0-3. Y is preferably a C1-C4 alkylene group, more preferably ethylene or propylene. $R_1$ and $R_2$ are preferably an C1-C3 alkyl group, more preferably a methyl or ethyl group.

Examples of aminosilanes with two alkoxysilane functionalities include bis-(2-trimethoxysilylethyl)amine, bis-(2-triethoxysilylethyl)amine, bis(3-triethoxysilylpropyl)amine (available under the trade name Dynasylan® 1122 from Degussa), bis(3-trimethoxysilylpropyl)amine (available under the trade name Dynasylan® 1124 from Degussa), bis(4-triethoxysilylbutyl)amine. Preferably, (bis-silyl)amine C is bis[3-(trialkoxysilyl)propyl] amine, more preferably bis[3-(trimethoxysilyl)propyl] amine.

Examples of aminosilanes with one alkoxysilane functionality include N-(n-butyl)-3-aminopropyltrimethoxysilane (available under the trade name Dynasylan® 1189 from Degussa), N-(n-butyl)-3-aminopropyltriethoxysilane, N-cyclohexyl-3-aminopropyltrimethoxysilane (available under the trade name Geniosil® GF 92 from Wacker Chemie), N-cyclohexyl-3-aminopropyltriethoxysilane, N-cyclohexyl-aminomethylmethyldiethoxysilane (available from Wacker Chemie under the trade name Geniosil® XL 924), N-cyclohexylaminomethyltriethoxysilane (available from Wacker Chemie under the trade name Geniosil® XL 926), N-phenylaminomethyl-trimethoxysilane (available from Wacker Chemie under the trade name Geniosil® XL 973). These are also suitable in the present invention, although can be less preferred.

The reaction in step (b) is preferably done in an organic solvent or a mixture of solvents. Suitable solvents are the same as mentioned above for the reaction in step (a). Preferably, no diamines and no diols are present during the synthesis, as their use will lead to an undesired increase in molecular weight of the polymer.

The progress of the reaction in step (b) can be monitored by analyzing the NCO content over time. The reaction is stopped when no NCO content is detected anymore.

The resulting alkoxysilyl-functional polymer contains urethane linkages. The polymer preferably has a weight average molecular weight Mw in the range 2,000-20,000, more preferably in the range 4,000-15,000. The polymer preferably has a number average molecular weight Mn in the range 1,000-8,000, more preferably in the range 2,000-6,000. Such molecular weight makes it possible to use the alkoxysilyl-functional polymer as a (soluble) additive in solventborne systems.

The resulting polymer preferably has no carboxylic and no hydroxyl groups. Therefore, the acid value is preferably below 5 mg KOH/g, more preferably 0 mg KOH/g. The acid value can be measured by potentiometric titration, e.g. in accordance with DIN EN ISO 3682. Preferably, the resulting polymer does not have OH functionality. The hydroxyl value is preferably <5 mg KOH/g, more preferably 0 mg KOH/g. The hydroxyl value can be measured by potentiometric titration using the TSI method, e.g. according to ASTM E1899-08.

The alkoxysilyl functionality of the obtained polymer can be hydrolyzed in water or alcoholic solvents, optionally in the presence of a silanol condensation catalyst.

The obtained polymer or the fluorine-containing silicone resin obtained during hydrolysis thereof, can advantageously be used in preparation of coating compositions, particularly, as an additive to a fluorine-free silicone resin.

Coating Composition

In another aspect, the present invention provides a coating composition comprising the above-described fluorinated, alkoxysilyl-functional polymer and/or a hydrolysed product thereof (fluorinated silicone resin), together with a fluorine-free silicone resin.

The coating composition preferably comprises a fluorinated silicone resin, which can be obtained by hydrolysis of the above-described fluorinated, alkoxysilyl-functional polymer, and a fluorine-free silicone resin.

The fluorinated silicone resin can be obtained by hydrolysis of the alkoxysilyl functionality of the above-described polymer in water or alcoholic solvents. Preferably, an alcohol or a mixture of alcohols is used. Suitable alcohols include, for example, methanol and ethanol. Also a mixture of water with an alcohol (or mixture of alcohols) can be used.

Optionally, the hydrolysis is carried out in the presence of a silanol condensation catalyst. Such catalysts are known to the skilled person.

Suitable catalysts are for example metal salts (e.g. zirconium nitrate, aluminium chloride), metalorganic compounds, particularly organotin compounds (e.g. dibutyltin dilaurate, dibutyltin acetoacetonate), acids and bases such as tertiary amines (e.g. triethylamine, triethyleneamine or 2,2'-diazabicyclo[2.2.2]octane (DABCO)). Under acids both Brønsted and Lewis acids are meant. Examples of acidic catalysts include sulfonic acids and its derivatives, e.g. methane sulfonic acid, 1-propane sulfonic acid, 1-pentane sulfonic acid, dodecylbenzene sulfonic acid, p-toluene sulfonic acid. In some embodiments, it can be preferred to use an acidic catalyst, particularly a sulfonic acid or its derivative, more particularly p-toluene sulfonic acid.

The fluorine-free silicone resin can be prepared by hydrolysis of a fluorine-free silane D. Advantageously, the hydrolysis can be done in-situ, during the preparation of the coating composition.

Fluorine-free silane D is preferably an alkoxy-functional silane. Optionally, it can further contain another functionality, such as an amine or epoxy group. In some embodiments, the alkoxy-functional silane does not contain amine functionality. Examples of such silanes include methyl trimethoxysilane (MTMS), methyl triethoxysilane (MTES), phenyl trimethoxysilane (PTMS), phenyl triethoxysilane (PTES), bis[trimethoxysilylpropyl] ethane (BTES), methacryloxypropyl trimethoxysilane (MAPTS), mercaptopropyl trimethoxysilane (MPTES), tetraethyl orthosilicate (TEOS), tetramethyl orthosilicate (TMOS), 3-glycidoxypropyl trimethoxysilane (GPTMS).

In some embodiments, fluorine-free silane D is an alkoxy-functional aminosilane, such as primary or secondary aminosilanes. Primary alkoxy-functional aminosilanes can have the following general formula:

$$NH_2-X_3-Si(R_3)_y(OR_4)_{3-y} \quad (II)$$

wherein $X_3$ is a covalent bond or a bifunctional saturated C1-C10 alkylene group, $R_3$ and $R_4$ are independently from each other a C1-C3 alkyl group, y is an integer selected from 0-3. $X_3$ is preferably a bifunctional C1-C4 alkyl group, more preferably propylene or butylene. $R_3$ and $R_4$ are preferably both an ethyl group. The alkoxyfunctional aminosilane can for example be N-(monoalkoxysilylalkyl)amine, N-(dialkoxysilylalkyl) amine or N-(trialkoxysilylalkyl)amine. As alkoxy group methoxy and ethoxy groups are preferred with ethoxy groups particularly preferred. In a preferred embodiment, the alkoxyfunctional aminosilane is N-(triethoxysilylpropyl) amine, also known as (3-aminopropyl)-triethoxysilane (APTES).

Secondary aminosilanes can be the same as described above for the secondary, alkoxysilyl-functional monoamine C described above.

In some embodiments, it can be preferred to use a mixture of aminosilanes and non-aminosilanes.

Hydrolysis of silane D can be carried out in the presence of water and/or an alcoholic solvent(s), such as those described above for the hydrolysis of the fluorinated, alkoxysilyl-functional polymer. Optionally, silanol condensation catalysts can be used, e.g. those described above.

In some embodiments, it can be preferred to carry out the hydrolysis of both fluorinated, alkoxysilyl-functional polymer and fluorine-free silane D in-situ during the preparation of the coating composition. In other embodiments, it can be advantageous to carry out the hydrolysis separately and after that, to mix the resulting fluorinated and non-fluorinated silicone resins.

Accordingly, the coating composition can be prepared by mixing the above-described fluorinated, alkoxysilyl-functional polymer and silane D in the presence of water and/or alcoholic solvent, preferably an alcohol or a mixture of alcohols. Alternatively, the coating composition can be prepared by mixing the fluorinated and non-fluorinated siloxane resins, which have been separately prepared.

The coating composition preferably comprises 0.1-50 wt. % of the fluorinated silicon resin, based on the total weight of the coating composition.

The coating composition preferably comprises 50-99.9 wt. % of the fluorine-free silicone resin, based on the total weight of the coating composition.

Without wishing to be bound by particular theory, inventors believe that the use of non-fluorinated silicone resin in the same composition provides for a higher crosslinking density after curing, which contributes to a more dense coating. As a result, the cured coating would have better wear resistance and stain resistance. In addition, the use of both fluorinated and non-fluorinated silicone resins in the same compositions is believed to lead to stratification during the curing process and separation of the resins in different layers or areas. This would lead to better compatibility of the coating composition with various substrates, e.g. glass, inorganic, metal and ceramic substrates.

In addition to the resins described above, other binder resins can be present in the coating composition as well, such as polyurethanes, polyethers, polyesters, polyacrylates.

The coating composition is preferably solventborne. Solventborne coating compositions comprise an organic solvent or a mixture of organic solvents as the major liquid phase when preparing and/or applying the coating composition. "Major liquid phase" means that organic solvents constitute at least 50 wt. % of the liquid phase, preferably at least 80 wt. %, more preferably at least 90 wt. %, in some embodiments even 100 wt. %. Compared to waterborne coating compositions, solventborne compositions are believed to have better performance in some properties, e.g. scratch resistance.

The coating composition preferably comprises 10-70 wt. %, more preferably 20-60 wt. % of organic solvents, based on the total weight of the coating composition.

Example of suitable organic solvents include alcohols (such as ethanol, isopropanol, n-butanol, n-propanol), esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; chlorinated hydrocarbons (such as $CH_2Cl_2$); ethers (such as diethyl ether, tetrahydrofuran, propylene glycol monomethyl ether) and mixtures thereof. Preferred organic solvents include butyl acetate, N-methyl-pyrrolidone, toluene, methyl isobutyl ketone (MIBK), methyl ethyl ketone (MEK), propylene glycol monomethyl ether and methoxy propyl acetate (PMA), or mixtures thereof.

The solid content of the coating composition according to the present disclosure can be in the range from 1 to 90 wt. %, preferably 5 to 65 wt. %, more preferably 10 to 50 wt. %.

The coating composition can further comprise conventional additives, such as fillers, antioxidants, matting agents, pigments, abrasion resistant particles, flow control agents, surfactants, plasticizers, adhesion promotors, thixotropic agents, light stabilizers and others.

The present invention further provides a method of coating a substrate, comprising applying the coating composition according to the invention to a substrate and curing the coating composition.

The coating composition can be applied onto a wide range of substrates by conventional techniques including spraying, rolling, blade-coating, pouring, brushing or dipping.

The coating composition is preferably thermally curable. Curing is preferably done at an elevated temperature, e.g. in the range 40-190° C., more preferably 50-150° C.

The curing temperature can be chosen depending on the substrate. Skilled person is aware of suitable curing temperatures. Conventional heating methods can be used, e.g. placing in an oven.

The coating composition according to the present invention can be applied to a wide range of substrates including metallic and non-metallic substrates, such as glass, metal, metal alloys, anodized substrates, plastics, composite etc. Suitable substrates include polycarbonate acrylonitrile butadiene styrene (PC/ABS), polycarbonate, polyacrylate, polyolefin, polyamide, polystyrene, polyamide, glass, wood, stone, aluminium, anodized aluminium, aluminium alloys, magnesium aluminium alloy, copper, Carbon Fiber Reinforced Polymer/Plastic (CFRP). Preferably, the substrate is glass or aluminium.

The coating composition according to the present invention can be used as a single layer applied directly to the substrate, or in multilayer systems, e.g. as a primer, basecoat or clearcoat.

The coating composition according to the present invention can be used in various coating industries, such as, consumer electronics, automotive, packaging, wood flooring and furniture, home appliance, glass and windows, sports equipment.

The present invention further provides a substrate coated with the coating obtained from the coating composition of the invention. The coatings according to the present invention have exceptionally good general properties including adhesion and scratch resistance. In addition, the coatings also have excellent easy clean and anti-stain properties as can be tested with a permanent marker pen and chemicals.

Examples

The invention will be demonstrated with reference to the following examples. All parts and percentages are by weight unless specified otherwise.

Fluorolink® E10-H—a dialcohol terminated, ethoxylated Perfluoropolyether from Solvay, average molecular weight (NMR): 1,700 amu, Kinematic viscosity at 20° C.: 115 cSt.

Dynasylan® 1124—bis(trimethoxysilylpropyl)amine from Evonik

IPDI—isophorone diisocyanate

DBTDL—dibutyltin dilaurate

MIBK—methyl isobutyl ketone

BAC—Butyl acetate

PMA—methoxy propyl acetate

Example 1: Synthesis of Fluoro-Additive

First, 60 g Fluorolink® E10-H was dropped into the 15 g IPDI with 0.05 g DBTDL at 60° C. for about 1 hour. After half of the isocyanate reacted, 25 g Dynasylan® 1124 and 50 g BAC were dropped into the reaction mixture for about 30 min. Then the reaction proceeded until no free NCO could be detected.

Example 2: Anti-Fingerprint Coating

First, 80 g Dynasylan® 1124 in 80 g BAC was hydrolyzed with 3.6 g of water and 70 g ethanol for about 3 hrs at room temperature. Then 1 g fluoro additive prepared in Example 1 and another 250 g BAC were added to the reaction system. The reaction proceeded for about 2 hrs and the product was collected after filtration with 25 μm filter paper.

Example 3: Performance of the Coating

The glass substrate was treated by plasma. The anti-fingerprint coating composition prepared in Example 2 was sprayed on glass and Al substrates to a dry film thickness of 2-4 μm. The samples were cured at 150° C. for 30 minutes and then placed at room temperature to continually cure for 5 days.

Static contact angle, pencil hardness and adhesion of the coating were measured. Static contact angle was measured on top of the cured coatings, respectively, with 20 Sessile drop method. The droplets were set as 3 μl/droplet, and the measurement temperature was about 20° C. The contact angles are measured using DataPhysics instrument with software SCA 20. Pencil hardness was measured according to a standard test where pencils (grade 9B to 9H) are used. Adhesion was measured by tape test according to ASTM D3359-02. Adhesion test result can vary from 0B—worst result (greater than 65% of the cross-cut area is removed by tape) to 5B—best result (0% of the cross-cut area is removed).

The results are presented in Table 1.

TABLE 1

| Surface properties | |
|---|---|
| Static contact angle/° | |
| Water | 108~111 |
| Diiodomethane | 85~88 |
| Ethylene glycol | 94~97 |
| Pencil hardness (on glass) | 9H |
| Pencil hardness (on aluminum) | 2H |
| Adhesion (on glass) | 5B |
| Adhesion (on aluminum) | 5B |

Easy Clean Properties

Easy clean properties were tested by writing "stain" with a ZEBRA permanent marker with a black ink on the coated substrate.

FIG. 1(a) shows in the upper half an uncoated glass substrate and in the lower half the substrate coated with the coating prepared in Example 2.

FIG. 1(b) shows the same substrates as FIG. 1(a), but after wiping off the ink with cloth.

It can be seen that the black ink does not shrink on uncoated glass substrate (FIG. 1(a), upper half). In contrast, the black ink shrank to beads on the surface of the coating according to the invention (FIG. 1(a), lower half). This means that the coated surface according to the invention has ink repellence.

After wiping (FIG. 1(b), lower half), the coated surface according to the invention is clean and does not show any ink remainders. Wiping of the ink from the uncoated glass is not possible (FIG. 1(b), upper half). This demonstrates the easy-clean properties of the coating according to the invention.

Steel Wood Abrasion

Abrasion resistance is tested using 5750 Linear Abraser by TABER®. The test is performed with weights of 0.5 or 1 kg on #0000 steel wool put on the coated panel (1 cm×1 cm rub surface area). Abrasion speed is set at 60 cycle/minute, distance 60 mm. After the test, the water contact angle (WCA) is measured again. The results are presented in Table 2.

TABLE 2

| | WCA before test | WCA after test |
|---|---|---|
| 1000 T/500 g | 108-111° | 105-107° |
| 2000 T/500 g | 108-111° | 100-105° |
| 3000 T/500 g | 108-111° | 95-101° |
| 1000 T/1 kg | 108-111° | 95-105° |

As seen from Table 2, the water contact angles did not significantly decrease after the test. This means that the coating has largely retained the anti-stain and easy clean properties.

The invention claimed is:

1. A fluorinated, alkoxysilyl-functional polymer, obtainable by a method consisting of the steps of:
   a) reacting an OH-functional (per)fluoropolyether (PFPE) with a polyisocyanate A under urethane formation reaction conditions, to obtain an isocyanate-functional intermediate B, and
   b) reacting isocyanate-functional intermediate B with a secondary, alkoxysilyl-functional monoamine C of general formula (I)

$$HN-(Y-Si-(OR_1)_x(R_2)_{3-x})_2 \quad (I)$$

wherein Y is bifunctional saturated C1-C10 alkylene group, $R_1$ and $R_2$ are independently from each other a C1-C3 alkyl group, x is an integer selected from 0-3, until no isocyanate content is detected anymore, to obtain the alkoxysilyl-functional polymer
   wherein polyisocyanate A is a diisocyanate and wherein the OH-functional (per)fluoropolyether is a dihydroxyl-terminated (per)fluoropolyether of general structure $$HO-(CH_2CH_2O)_p-CH_2-CF_2-R_f-CF_2-CH_2-(OCH_2CH_2)_q-OH$$

wherein p and q are integers independently chosen from 0 to 50, $R_f$ represents a bifunctional radical having perfluoropolyether structure $(CF_2CF_2O)_n$, $(CF_2O)_m$ or $(CF_2-CF_2-O)_n-(CF_2-O)_m$, and wherein n and m are integers independently chosen from 1 to 100,
   wherein the fluorinated, alkoxysilyl-functional polymer has a weight average molecular weight Mw in the range of from 2,000 to 20,000 Da and a number average molecular weight Mn in the range of from 1,000 to 8,000 Da.

2. The polymer according to claim 1, wherein the polyisocyanate A is a cycloaliphatic diisocyanate.

3. The polymer according to claim 1, wherein the secondary, alkoxysilyl-functional monoamine C is bis[3-(trialkoxysilyl)propyl] amine.

4. A solventborne coating composition comprising the fluorinated, alkoxysilyl-functional polymer according to claim 1 and further a fluorine-free silicone resin.

5. The coating composition according to claim 4, wherein the fluorine-free silicone resin is obtained by hydrolysis of a fluorine-free silane D.

6. The coating composition according to claim 5, wherein the fluorine-free silane D is selected from alkoxysilanes, alkoxy-functional aminosilanes and mixtures thereof.

7. A method of coating a substrate, comprising applying the solventborne coating composition according to claim 4 to a substrate and curing the coating composition.

8. A coated substrate obtained according to the method of claim 7.

9. The coated substrate according to claim 8, wherein the substrate is selected from glass, metal, metal alloys, anodized substrates, plastics and composite.

10. The coated substrate according to claim 9, wherein the substrate is selected from the group consisting of polycarbonate acrylonitrile butadiene styrene (PC/ABS), polycarbonate, polyacrylate, polyolefin, polyamide, polystyrene, glass, wood, copper, aluminium, anodized aluminium, aluminium alloys, magnesium aluminium alloy, and Carbon Fiber Reinforced Polymer/Plastic (CFRP).

* * * * *